(12) United States Patent
Shinoda et al.

(10) Patent No.: US 9,338,264 B2
(45) Date of Patent: May 10, 2016

(54) MOBILE ELECTRONIC DEVICE AND WATERPROOF COVER

(71) Applicant: FUJITSU LIMITED, Kawasaki-shi, Kanagawa (JP)

(72) Inventors: Takao Shinoda, Yokohama (JP);
Ryosaku Inamura, Hadano (JP);
Shingo Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 81 days.

(21) Appl. No.: 14/070,049

(22) Filed: Nov. 1, 2013

(65) Prior Publication Data

US 2014/0057688 A1 Feb. 27, 2014

Related U.S. Application Data

(63) Continuation of application No. PCT/JP2011/063378, filed on Jun. 10, 2011.

(51) Int. Cl.
*H04M 1/00* (2006.01)
*H04M 1/02* (2006.01)
*H04M 1/18* (2006.01)
(Continued)

(52) U.S. Cl.
CPC .......... *H04M 1/0202* (2013.01); *H01M 2/1066* (2013.01); *H04B 1/3888* (2013.01); *H04M 1/0214* (2013.01); *H04M 1/0262* (2013.01); *H04M 1/0274* (2013.01); *H04M 1/18* (2013.01)

(58) Field of Classification Search
CPC ... H04M 1/18; H04M 1/0262; H04M 1/0202; H04M 1/0274; H04M 1/0277; H04M 1/0214; H04M 19/04; H04M 1/0249; H04M 1/026; H04M 1/04; H04B 2001/3894; H04B 1/3833; A45C 11/22; A45C 11/00
USPC ............. 455/575.8, 575.1, 550.1, 572, 575.4, 455/128, 425; 361/679.56, 679.57, 679.3, 361/730, 753, 801; 206/811, 701
See application file for complete search history.

(56) References Cited

U.S. PATENT DOCUMENTS 8,828,572 B2 * 9/2014 Ishida .......................... 429/100
2009/0291709 A1 * 11/2009 Lee et al. ................... 455/556.2
(Continued)

FOREIGN PATENT DOCUMENTS

JP 2009-094136 A 4/2009
JP 2010-080910 A 4/2010
JP 2010-268282 A 11/2010
(Continued)

OTHER PUBLICATIONS

International Search Report for PCT/JP2011/063378, Mailing Date of Aug. 2, 2011.
(Continued)

*Primary Examiner* — Fred Casca
(74) *Attorney, Agent, or Firm* — Westerman, Hattori, Daniels & Adrian, LLP

(57) ABSTRACT

A mobile electronic device includes: a body unit that includes a waterproof area; and a cover unit that covers the waterproof area. One of the cover unit and the body unit includes: a sealing member that contacts a contact surface formed on a same plane as the other all along the periphery of the waterproof area, and seals the waterproof area; and a regulation unit that regulates the position of the sealing member.

10 Claims, 19 Drawing Sheets

(51) Int. Cl.
*H01M 2/10* (2006.01)
*H04B 1/3888* (2015.01)

(56) References Cited

U.S. PATENT DOCUMENTS

2011/0140375 A1 6/2011 Sasaki et al.
2012/0045679 A1 2/2012 Ishida

FOREIGN PATENT DOCUMENTS

| JP | 2011-044888 A | 3/2011 |
| KR | 10-2011-0041384 A | 4/2011 |
| WO | 2010/024097 A1 | 3/2010 |
| WO | 2010/131307 A1 | 11/2010 |

OTHER PUBLICATIONS

Notification of Transmittal of Translation of the International Preliminary Report on Patentability (Forms PCT/IB/326) of International Application No. PCT/JP2011/063378 mailed Dec. 27, 2013 with Forms PCT/IB/373, and PCT/ISA/237 (7 pages).
Office Action dated Mar. 24, 2015, issued in corresponding Chinese Patent Application No. 201180071307.5, with English translation (23 pages).
Office Action dated Apr. 27, 2015, issued in corresponding Korean Patent Application No. 10-2013-7031313, with English translation (10 pages).
Office Action dated Sep. 24, 2015, issued in counterpart Korean Patent Application No. 10-2013-7031313, with English translation.

\* cited by examiner

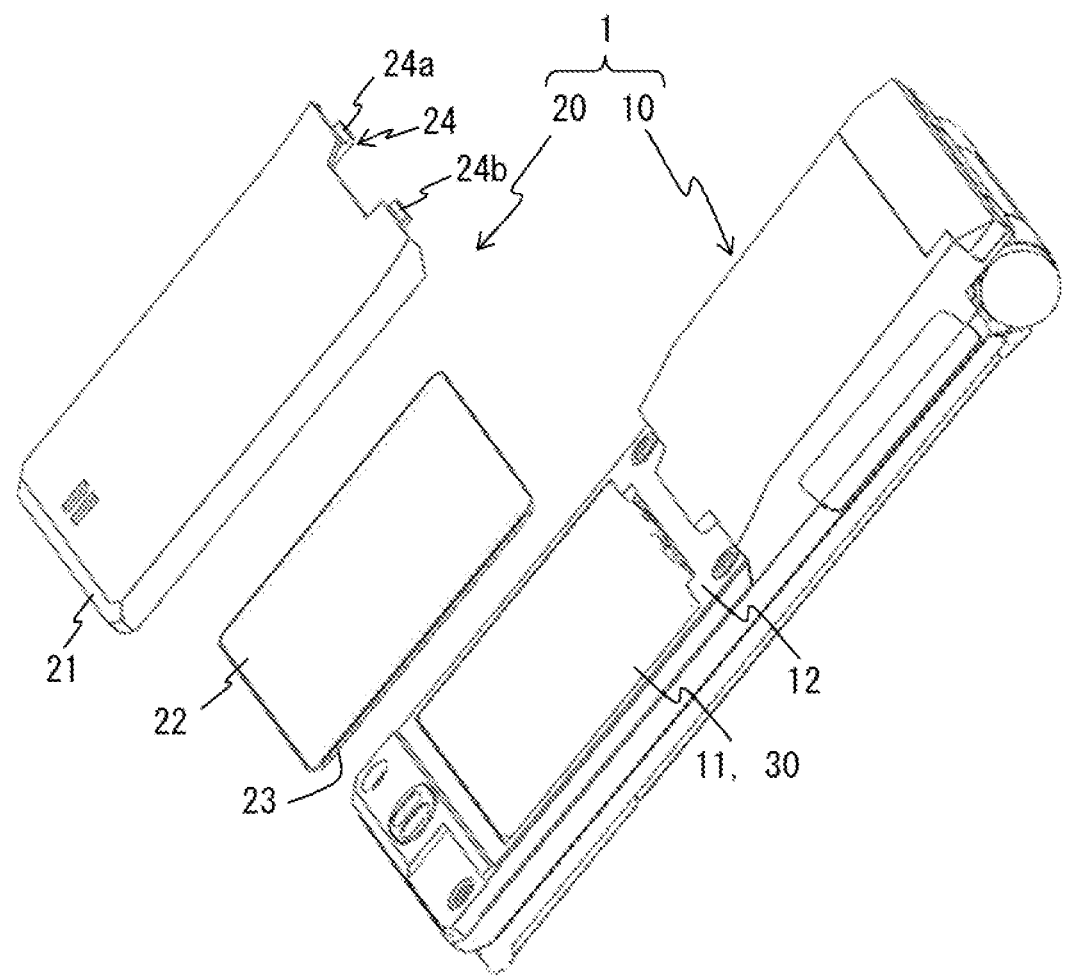
F I G. 1

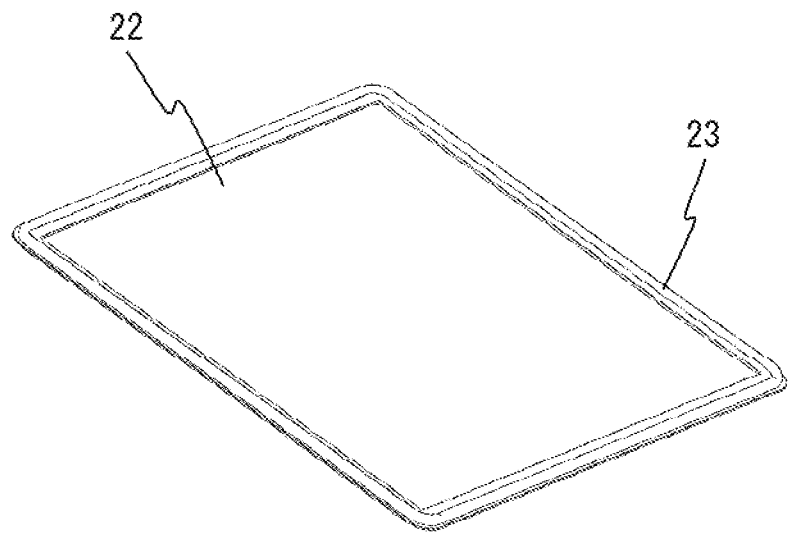
F I G. 3

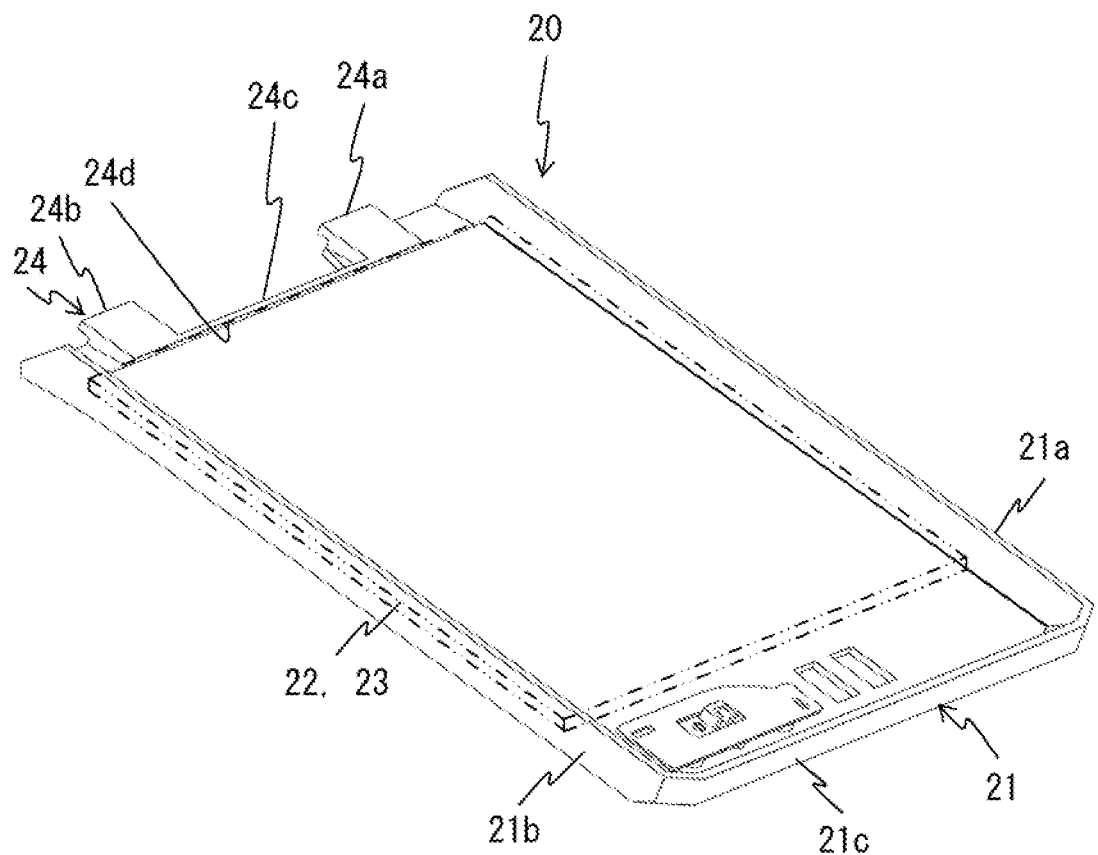
F I G. 17

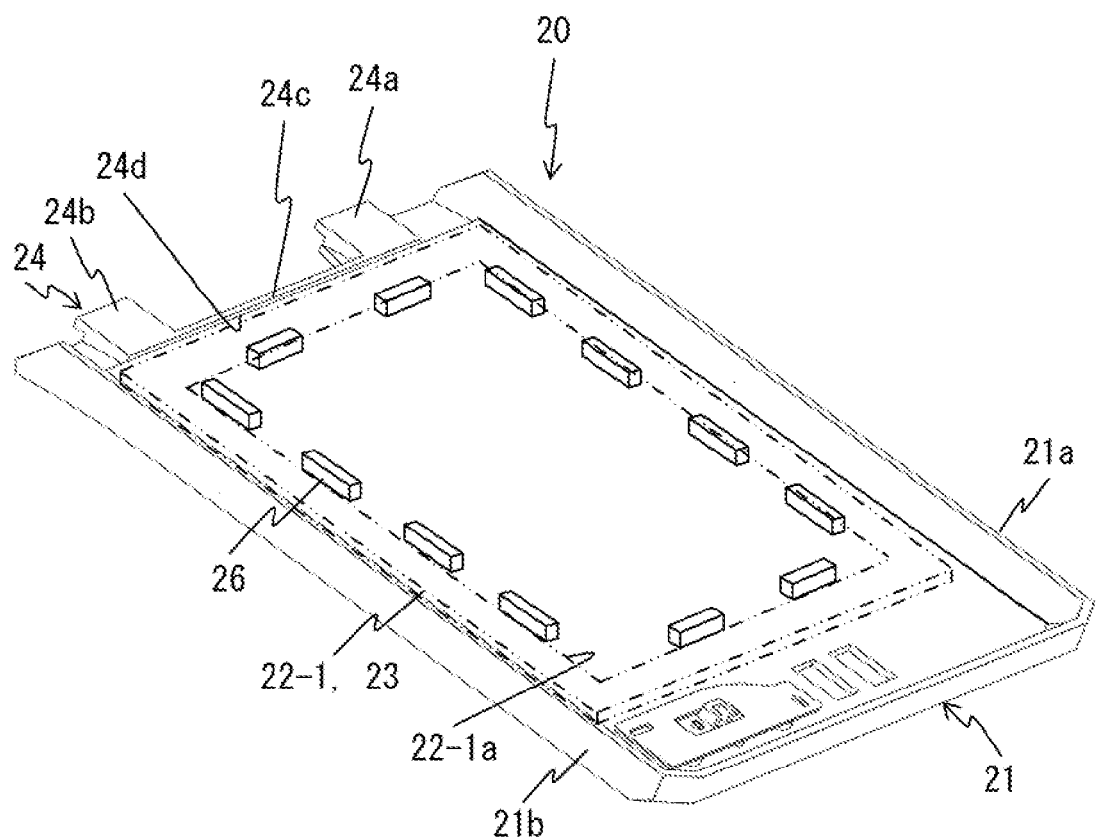
F I G. 18

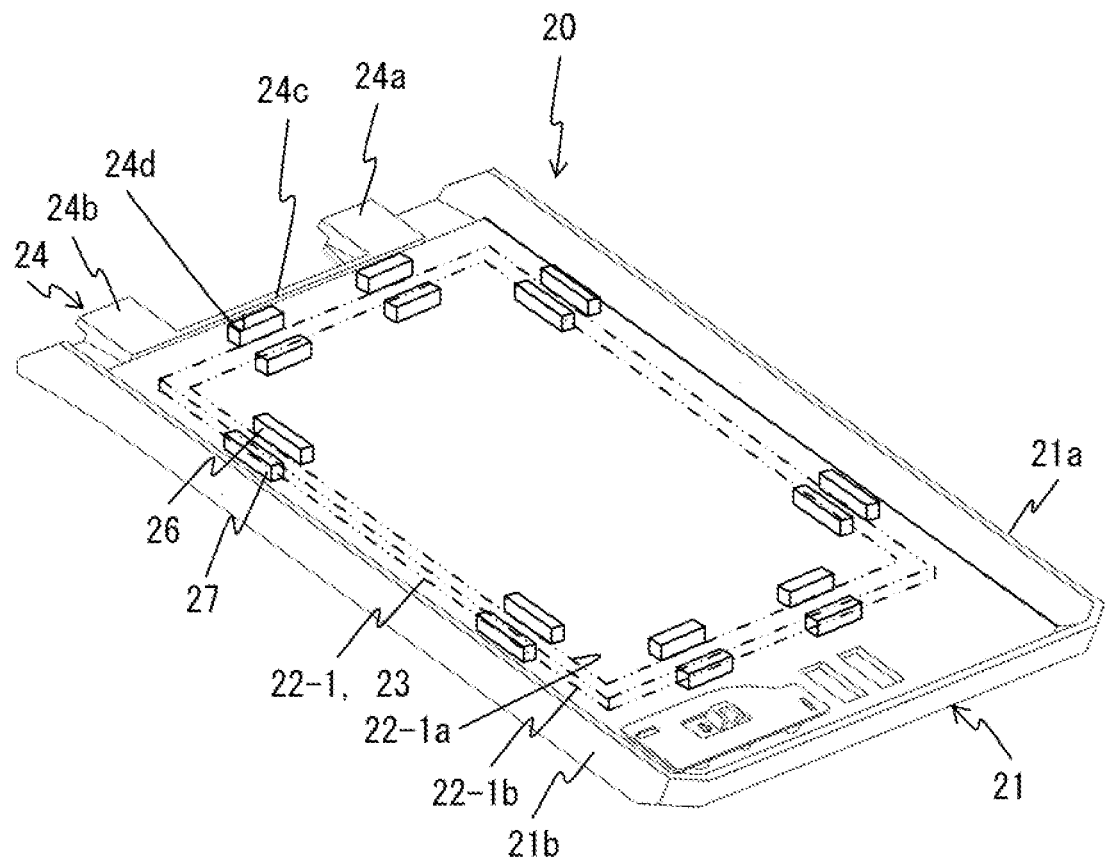
F I G. 19

MOBILE ELECTRONIC DEVICE AND WATERPROOF COVER

CROSS-REFERENCE TO RELATED APPLICATION

This application is a continuation application of International Application PCT/JP2011/063378 filed on Jun. 10, 2011, and designated the U.S., the entire contents of which are incorporated herein by reference.

FIELD

The embodiments discussed herein are related to a mobile electronic device and a waterproof cover used in the mobile electronic device.

BACKGROUND

A sealing member for sealing a waterproof area has conventionally been used in a mobile electronic device such as a mobile telephone etc. Well known as the sealing member is a cut-off packing which is squeezed from both sides in the direction of the width of the mobile electronic device.

A deformation protection rib for suppressing the deformation of a cut-off packing is also well known.

Patent Document 1: Japanese Laid-open Patent Publication No. 2010-268282

SUMMARY

According to an aspect of the embodiments, a mobile electronic device includes a body unit that includes a waterproof area and a cover unit that covers the waterproof area. One of the cover unit and the body unit includes: a sealing member that contacts a contact surface formed on a same plane as the other all along the periphery of the waterproof area and seals the waterproof area; and a regulation unit that regulates the position of the sealing member.

The object and advantages of the invention will be realized and attained by means of the elements and combinations particularly pointed out in the claims.

It is to be understood that both the foregoing general description and the following detailed description are exemplary and explanatory and are not restrictive of the invention

BRIEF DESCRIPTION OF DRAWINGS

FIG. 1 is an exploded perspective view of a mobile telephone;

FIG. 3 is a perspective view of a rectangular resin sheet;

FIG. 17 is a perspective view of the cover unit whose left wall is a regulation unit;

FIG. 18 is a perspective view of the regulation unit which contacts the inner periphery surface of the resin sheet in frame form; and FIG. 19 is a perspective view of the regulation unit which contacts the inner periphery surface and outer periphery surface of the resin sheet in frame form.

DESCRIPTION OF EMBODIMENTS

The waterproof cover having a cut-off packing which is squeezed from both sides in the direction of the width of the above-mentioned mobile electronic device requires the thickness of the wall which stands the pressure on the cut-off packing, thereby increasing the dimension in the direction of the width.

Furthermore, the above-mentioned waterproof cover needs the space for reservation of the bending R at the four corners of the cut-off packing.

In addition, when the waterproof area is, for example, a battery storage unit, it is difficult to satisfy both the increase of the dimension in, for example, in the direction of the width of an electronic device by an increase of the recent battery capacity, and the maintenance of the dimension of the electronic device for operability of the electronic device.

For downsizing a mobile electronic device, the space in which the cut-off packing is arranged is restricted. Therefore, when there occurs a displacement of a cut-off packing, the cut-off function is not maintained.

The mobile electronic device and the waterproof cover according to the embodiments of the present invention are described below with reference to the attached drawings.

FIG. 1 is an exploded perspective view of a mobile telephone 1.

Figure 2:
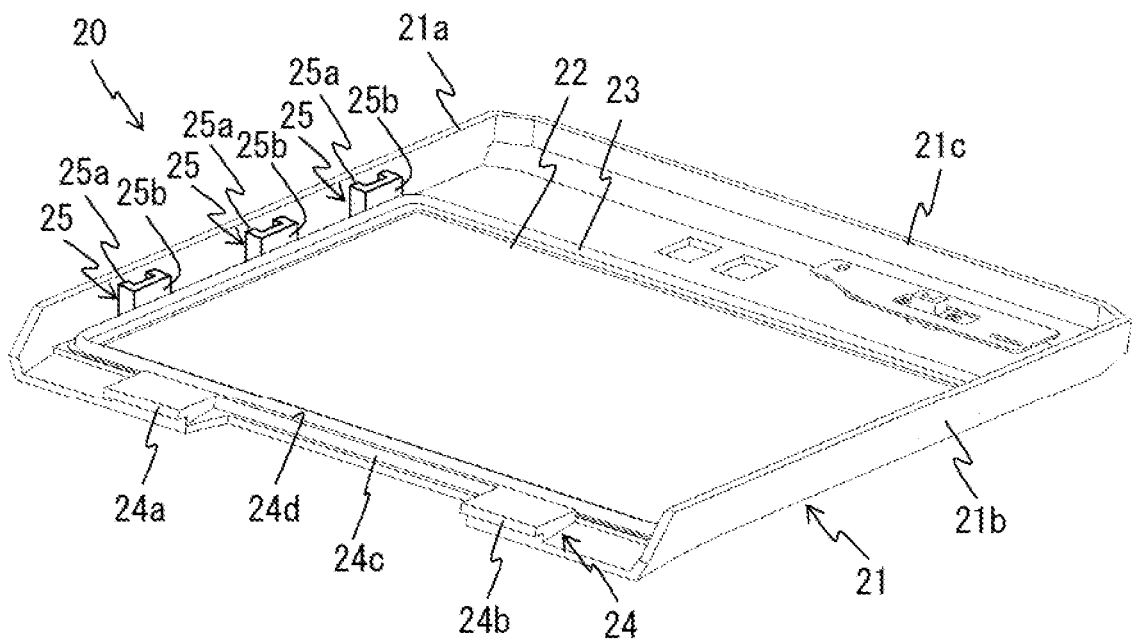
FIG. 2 is a perspective view of a cover unit viewed from the inside.

FIG. 2 is a perspective view of a cover unit viewed from the inside;

FIG. 3 is a perspective view of a rectangular resin sheet 22.

The mobile telephone 1 illustrated in FIG. 1 includes a body unit 10, and a cover unit 20 as a waterproof cover. The mobile telephone 1 is an example of a mobile electronic device.

The cover unit 20 is arranged to cover a battery storage unit 11 of the body unit 10. A battery 30 is arranged in the battery storage unit 11. The battery storage unit 11 is an example of a waterproof area.

The body unit 10 includes a plane part 12 provided around the battery storage unit 11. The plane part 12 is formed on the same surface continuously along the periphery of the battery storage unit 11. The plane part 12 is an example of a contact surface which is formed on the same surface and contacts a sealing member 23 of the cover unit 20.

The plane part 12 is formed in the size in which the plane part 12 may keep contact with the sealing member 23 while the sealing member 23 is sliding when the cover unit 20 is attached to the mobile telephone 1 by the sealing member 23 contacting the plane part 12 and sliding in the pressed state.

As illustrated in FIGS. 1 through 3, the cover unit 20 includes a cover body 21, a resin sheet 22, a sealing member 23, a nail unitary construction regulation unit 24, and a wall unitary construction regulation unit 25.

The cover body 21 is substantially rectangular and has the width equal to that of the body unit 10 of the mobile telephone 1, and forms the surface of the bottom side in the back of the body unit 10 (back of the mobile telephone 1). In addition, as illustrated in FIG. 2, there are a left wall 21a, a right wall 21b, and a bottom wall 21c around the cover body 21. These left wall 21a, right wall 21b, and bottom wall 21c form a part of the right and left sides and a part of the bottom of the body unit 10.

The resin sheet 22 is rectangular thin plate, and is attached to the inside of the cover body 21 through a double-sided tape. The resin sheet 22 is made of, for example, polyethylene terephthalate, polycarbonate, or polyimide, and is flexible.

The sealing member 23 is provided all along the periphery of the battery storage unit 11 at the peripheral end part of the surface (inside the cover unit 20) of the resin sheet 22.

Figure 4:
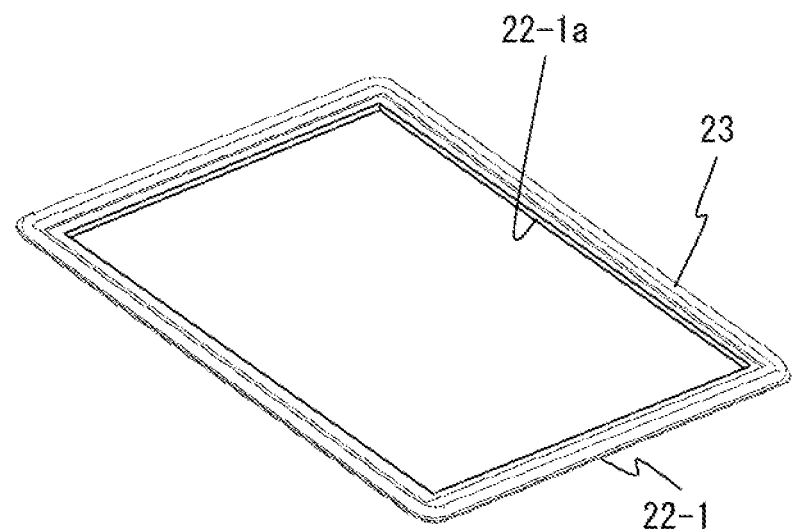
FIG. 4 is a perspective view of a resin sheet in frame form.

As illustrated in FIG. 4, the resin sheet 22 may be a resin sheet 22-1 in frame form formed all along the periphery of the battery storage unit 11. An inner periphery surface 22-1a of the resin sheet 22-1 is also rectangular.

The sealing member 23 contacts the plane part 12 of the body unit 10 all along the periphery of the battery storage unit 11, and seals the battery storage unit 11.

Figure 13:
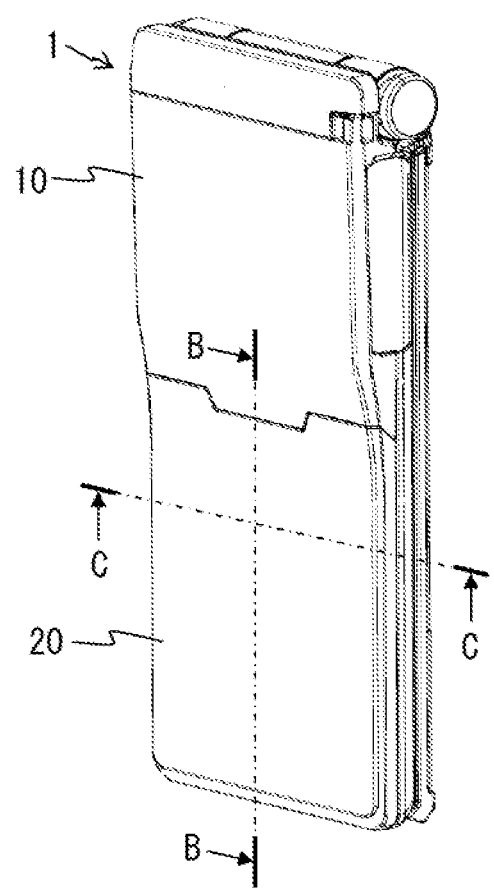
FIG. 13 is a perspective view of a mobile telephone.
Figure 14:
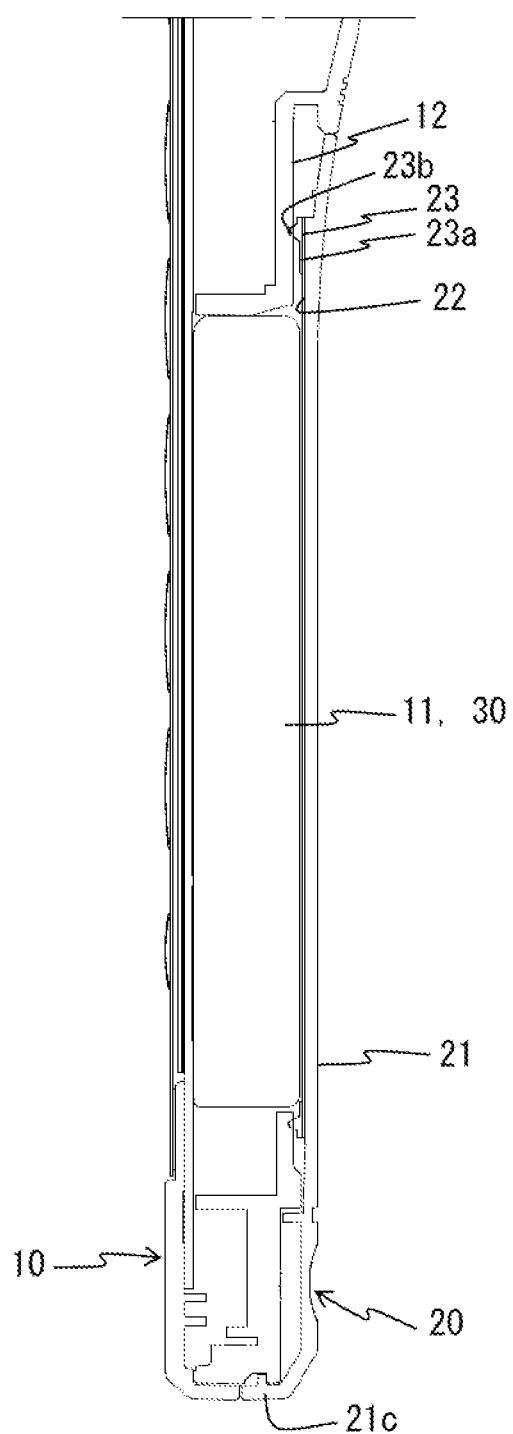
FIG. 14 is a sectional view along B-B in FIG. 13.
Figure 15:
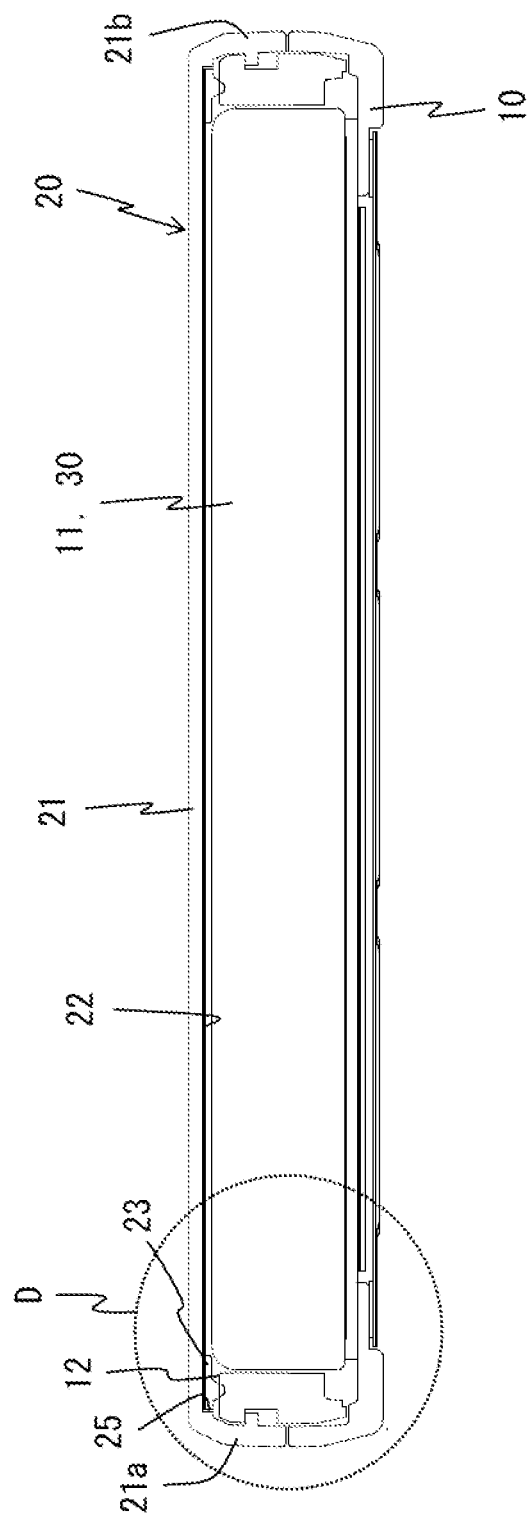
FIG. 15 is a sectional view along C-C in FIG. 13.
Figure 16:
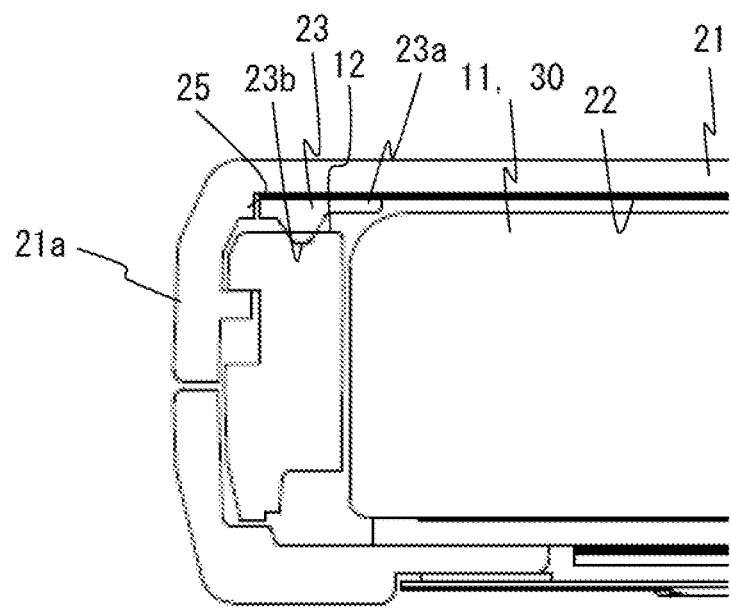
FIG. 16 is an expanded view of the part D in FIG. 15.

As illustrated in FIGS. 14 through 16, the sealing member 23 includes a sealing base unit 23a and a projection unit 23b provided all along the periphery of the battery storage unit 11. The projection unit 23b projects from the sealing base unit 23a and contacts the plane part 12. The section of the projection unit 23b orthogonal to the periphery of the battery storage unit 11 is semicircular or semi-oval. Between the front side and the back side connected by the hinge unit of the mobile telephone 1 in FIG. 13, the sections illustrated in FIGS. 14 through 16 indicate only the back side.

The sealing member 23 may be coated with low friction at least on the projection unit 23b which contacts the plane part 12.

Figure 5:
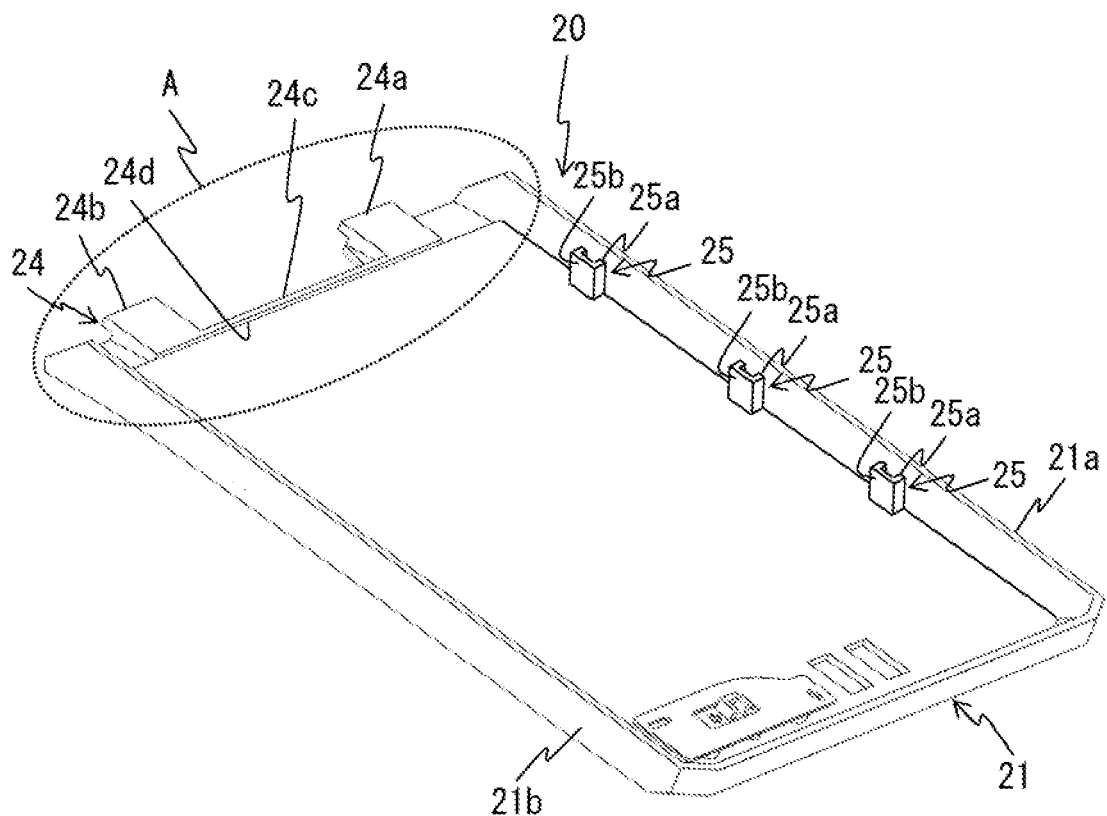
FIG. 5 is a perspective view of the cover unit when the resin sheet is removed.
Figure 8:
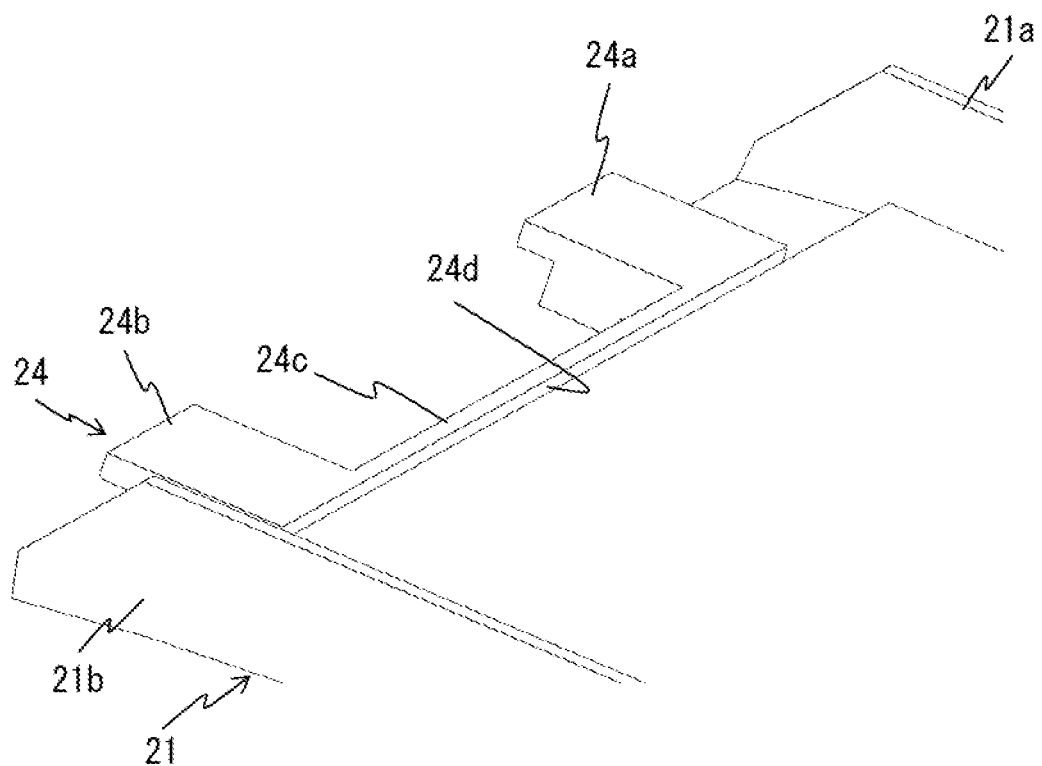
FIG. 8 is an expanded view of FIG. 5.

As illustrated in FIGS. 2, 5, and 8, the nail unitary construction regulation unit 24 includes two nail units 24a and 24b engaged in the body unit 10, and a coupling unit 24c which is provided as a unitary construction with the two nail units 24a and 24b, and connects the two nail units 24a and 24b.

Thus, the nail unitary construction regulation unit 24 is provided as a unitary construction with the two nail units 24a and 24b and the coupling unit 24c. The nail unitary construction regulation unit 24 regulates the position of the sealing member 23 by touching the resin sheet 22 on a regulation surface 24d on the opposite side of the nail units 24a and 24b.

As illustrated in FIGS. 2 and 5, three wall unitary construction regulation units 25 are provided each projecting from the left wall 21a as a unitary construction with the left wall 21a. The wall from which the wall unitary construction regulation unit 25 projects may be a wall (the right wall 21b, the bottom wall 21c, etc.) other than the left wall 21a, and a plurality of wall unitary construction regulation units may project from a plurality of walls.

The wall unitary construction regulation unit 25 projects from the left wall 21a so that an open side end part 25a having a rectangular section one of whose four sides is open faces the left wall 21a. In addition, the wall unitary construction regulation unit 25 regulates the position of the sealing member 23 by touching the resin sheet 22 at a close side end part 25b on the opposite side of the open side end part 25a.

Figure 6:
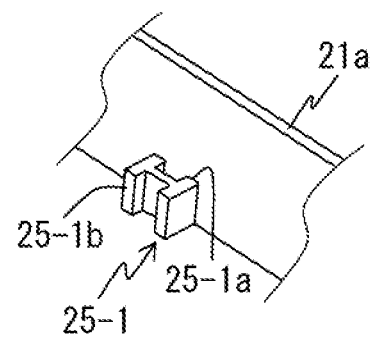
FIG. 6 is a perspective view (1) of a variation example of a wall unitary construction regulation unit.

As illustrated in FIG. 6, the wall unitary construction regulation unit 25 may be a wall unitary construction regulation unit 25-1 which projects from the left wall 21a so that an open side end part 25-1a as one side of the H-shaped section faces the left wall 21a. The wall unitary construction regulation unit 25-1 regulates the position of the sealing member 23 by touching the resin sheet 22 at another open side end part 25-1b.

Figure 7:
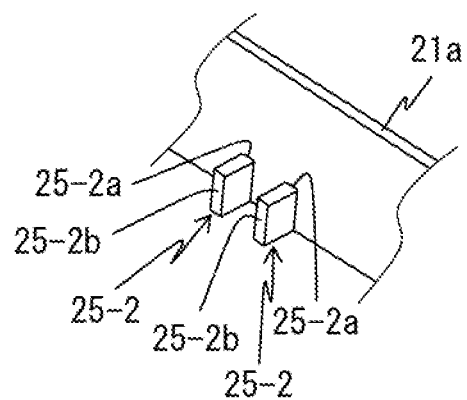
FIG. 7 is a perspective view (2) of a variation example of a wall unitary construction regulation unit.

As illustrated in FIG. 7, the wall unitary construction regulation unit 25 may be a wall unitary construction regulation unit 25-2 which is a rectangular parallelepiped, and projects from the left wall 21a so that one end part 25-2a faces the left wall 21a. The wall unitary construction regulation unit 25-2 regulates the position of the sealing member 23 by touching the resin sheet 22 at another end part 25-2b.

Furthermore, the wall unitary construction regulation unit 25-2 may be arranged as one or more sets each configured by two units, or arranged as one or more wall unitary construction regulation units 25-2.

Figure 9:
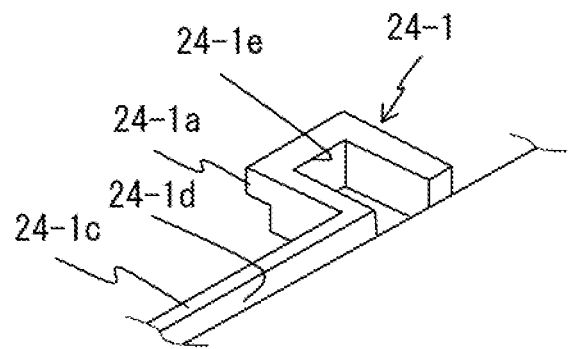
FIG. 9 is a perspective view (1) of a variation example of a nail unitary construction regulation unit.

As illustrated in FIG. 9, the nail unitary construction regulation unit 24 may be a nail unitary construction regulation unit 24-1 in which each (convex part) of two nail units 24-1a (only one is illustrated) connected by a coupling unit 24-1c projects from the cover body 21 as having a rectangular section one of whose four sides is open. The nail unitary construction regulation unit 24-1 regulates the position of the sealing member 23 by touching the resin sheet 23 at an end part 24-1d on an aperture 24-1e side.

Figure 10:
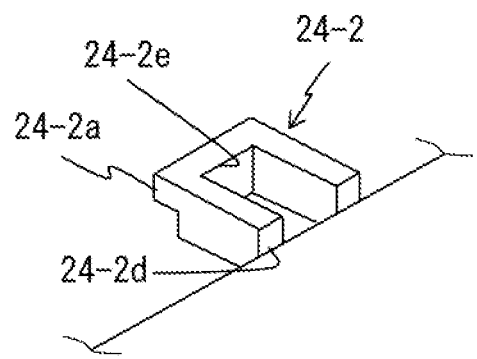
FIG. 10 is a perspective view (2) of a variation example of a nail unitary construction regulation unit.

As illustrated in FIG. 10, the nail unitary construction regulation unit 24 may be a nail unitary construction regulation unit 24-2 in which a nail unit 24-2a (only one unit is illustrated) and the regulation surface 24d are provided as a unitary construction for each convex part not connected by a coupling unit. The nail unitary construction regulation unit 24-2 regulates the position of the sealing member 23 by projecting from the cover body 21 as having a rectangular section one of whose four sides is open, and touching the sealing member 23 at an end part 24-2d on an aperture 24-2e side.

Figure 11:
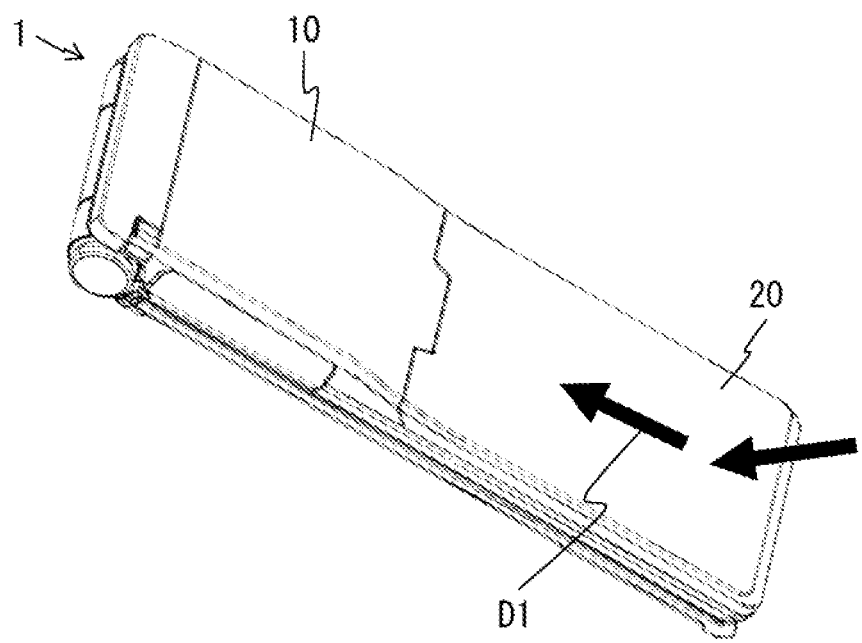
FIG. 11 is a perspective view of a method of attaching the cover unit.

As illustrated in FIG. 11, the cover unit 20 slides with the sealing member 23 contacting the plane part 12 in a pressed state (direction D1 of sliding), and with the nail units 24a and 24b engaged in the body unit 10, thereby attaching the cover unit 20 to the mobile telephone 1.

Figure 12:
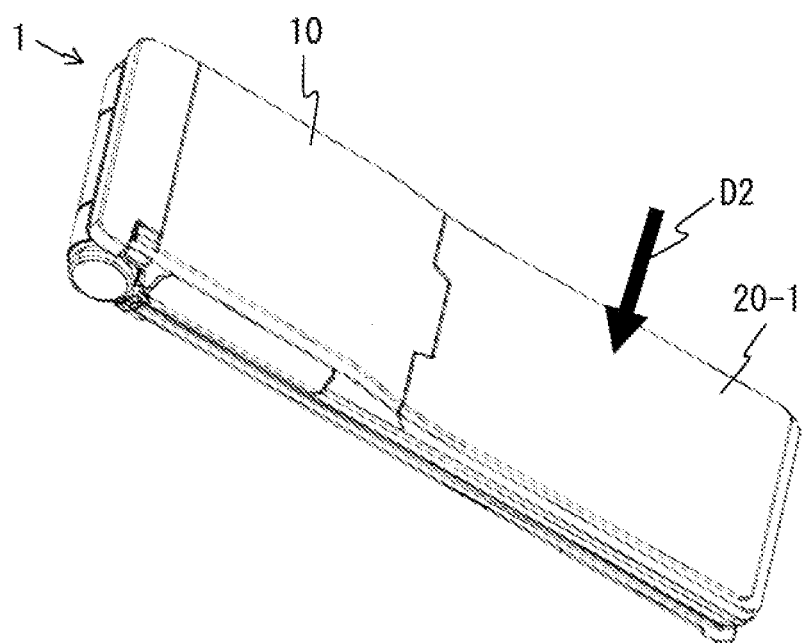
FIG. 12 is a perspective view of a variation example of the method of attaching the cover unit.

However, as illustrated in FIG. 12, the cover unit 20 may be a cover unit 20-1 which does not slide, but is attached to the mobile telephone 1 by being engaged in the body unit 10 (direction D2 of engagement).

As a regulation unit which regulates the position of the sealing member 23, a wall of the cover body 21, for example, the left wall 21a and the right wall 21b illustrated in FIG. 17 may regulates the position of the sealing member 23 by touching the resin sheet 22.

In addition, when the resin sheet 22-1 in frame form illustrated in FIG. 4 as described above is used, a plurality of regulation units 26 which touch the inner periphery surface 22-1a of the resin sheet 22-1 may be arranged on the cover unit 20. In the example in FIG. 18, a regulation unit 26 is arranged as four units each of the left and right of the cover unit 20, and two units each in front and at back of the cover unit 20.

Furthermore, as illustrated in FIG. 19, a plurality of regulation units 26 which touch the inner periphery surface 22-1a of the resin sheet 22-1 in frame form, and a plurality of regulation units 27 which touches an outer periphery surface 22-1b may be arranged on the cover unit 20. In the example in FIG. 19, two regulation units 26 are arranged each in front, at back, left, and right.

In the three wall unitary construction regulation units 25 illustrated in FIG. 2, for example, the wall unitary construction regulation unit 25 may be arranged near the corner of the sealing member 23 (around the front end or the back end in the direction D1 of the sliding as illustrated in FIG. 19), thereby more correctly regulating the position of the sealing member 23.

In the present embodiment, the sealing member 23 is arranged on the cover unit 20 (resin sheet 22) side, but the sealing member 23 may be arranged on the mobile telephone 1 side, and the plane part (contact surface) 12 may be arranged on the cover unit 20 side.

Furthermore, in the present embodiment, the nail unitary construction regulation unit 24 is configured as a unitary construction with the nail units 24a and 24b at the front side, but the nail units may be arranged on the left or right, or at the back end of the cover unit 20 as a unitary construction with the regulation unit.

In the present embodiment, an example of arranging both the nail unitary construction regulation unit 24 and the wall unitary construction regulation unit 25 is explained above as an example of a regulation unit, but one of them may be arranged, and none of them may be arranged. It is preferable that the resin sheet 22 is positioned in two directions by, for example, touching the two sides of the resin sheet 22.

In addition, according to the present embodiment, an example of the plane part 12 formed on the same plane is explained as an example of a contact surface which contacts the sealing member 23. However, automatically it is preferable that the contact surface is a plane, a surface which is not a complete plane is also acceptable. For example, a curved surface may be acceptable.

Furthermore, according to the present embodiment, the battery storage unit 11 is described as an example of a waterproof area, but the cover unit 20 may be provided in a waterproof area other than the battery storage unit 11.

In the above-mentioned embodiment, the cover unit 20 includes the sealing member 23, and the regulation units 24 through 27. The sealing member 23 contacts the plane part (contact surface) 12 formed on the same surface of the body unit 10 all along the periphery of the battery storage unit (waterproof area) 11, thereby sealing the battery storage unit 11. The regulation units 24 through 27 regulate the position of the sealing member 23.

Therefore, the mobile telephone 1 may be downsized by suppressing the increase in dimension in the direction of the width of the wall etc. of the mobile telephone 1 which occurs when, for example, the sealing member 23 is pressed in the direction of the width of the mobile telephone 1. Furthermore, since the regulation units 24 through 27 regulates the position of the sealing member 23 which is arranged in a limited space, a displacement, a deformation, etc. which occurs when the sealing member 23 is arranged may be prevented, thereby reserving the cut-off function.

Therefore, according to the present embodiment, the mobile telephone 1 may be downsized with the cut-off performance maintained.

Furthermore, according to the present embodiment, the sealing member 23 and the regulation units 24 through 27 are arranged on the cover unit 20 side, not on the body unit 10 side. Therefore, the sealing member 23 may be easily arranged on the mobile telephone 1, the cut-off performance may be improved, and the sealing member 23 as a consumable unit may be easily replaced.

Furthermore, according to the present embodiment, the cover unit 20 includes a nail units 24a and 24b which are engaged in the body unit 10, and the regulation surface 24d (nail unitary construction regulation unit 24) is provided as a unitary construction with the nail units 24a and 24b. Therefore, the position of the sealing member 23 may be regulated with a simple configuration, thereby further downsizing the mobile telephone 1.

In addition, according to the present embodiment, as illustrated in FIGS. 9 and 10, the nail unitary construction regulation units 24-1 and 24-2 (regulation surfaces 24-1d and 24-2d) and the nail units 24-1a and 24-2a are provided as a unitary construction with the convex part which projects from the cover unit 20 with rectangular section one of whose four sides is open. The regulation units 24-1 and 24-2 (regulation surfaces 24-1d and 24-2d) regulate the position of the sealing member 23 at the end parts 24-1d and 24-2d on the apertures 24-1e and 24-2e sides of the convex part. Furthermore, the nail units 24-1a and 24-2a are provided at the end part on the close side opposite the end parts 24-1d and 24-2d on the open sides. Therefore, the position of the sealing member 23 may be more correctly regulated with a simple configuration.

Furthermore, according to the present embodiment, the cover unit 20 includes the two nail units 24a and 24b which are engaged in the body unit 10 and the coupling unit 24c which is provided as a unitary construction with the two nail units 24a and 24b and couples the two nail units 24a and 24b. In addition, the nail unitary construction regulation unit 24 (regulation surface 24d) is provided as a unitary construction with the two nail units 24a and 24b and the coupling unit 24c. Therefore, the position of the sealing member 23 may be more correctly regulated with a simple configuration.

According to the present embodiment, the wall unitary construction regulation unit 25 is provided as a unitary construction with the left wall 21a so that the unit projects from the left wall (wall surface) 21a provided around the cover unit 20. Therefore, a simple configuration may be realized, thereby further downsizing the mobile telephone 1.

According to the present embodiment, as illustrated in FIGS. 2 and 5, the wall unitary construction regulation unit 25 projects from the left wall 21a so that the open side end part 25a having a rectangular section one of whose four sides is open faces the left wall 21a. Furthermore, the wall unitary construction regulation unit 25 regulates the position of the sealing member 23 at the close side end part 25b opposite the open side end part 25a. Therefore, while suppressing the sink which occurs on the wall surface during the formation when the close part faces the wall surface, the position of the sealing member 23 may be regulated.

Furthermore, according to the present embodiment, as illustrated in FIG. 6, the wall unitary construction regulation unit 25-1 projects from the left wall 21a so that one open side end part 25-1a as one side of the H-shaped section faces the left wall 21a, and regulates the position of the sealing member 23 at another open side end part 25-1b. Therefore, while suppressing the sink which occurs on the wall surface, the position of the sealing member 23 may be more correctly regulated.

In addition, as illustrated in FIG. 17, when the left wall (wall surface) 21a provided around the cover unit 20 functions as a regulation unit, the position of the sealing member 23 may be regulated with a simple configuration.

Furthermore, according to the present embodiment, the cover unit 20 includes a resin sheet 22 with the sealing member 23 formed on the surface. Therefore, the sealing member 23 may be simply arranged more correctly. Additionally, as compared with a metal plate, a lightweight configuration may be designed with the wave etc. for charging the battery 30 prevented from being cut off. Furthermore, as compared with the case in which the cover body 21 and the resin sheet 22 are designed as having a double cover structure, the attaching operation of the cover unit 20 may be more easily performed.

In addition, according to the present embodiment, the cover unit 20 regulates the position of the sealing member 23 by touching the resin sheet 22. Therefore, the position of the sealing member 23 may be more correctly regulated.

Furthermore, as illustrated in FIGS. 4 and 18, when the resin sheet 22-1 is formed in frame form all along the periphery of the battery storage unit 11, the cover unit 20 includes a plurality of regulation units 26 which touch the inner periphery surface 22-1a of the resin sheet 22-1, thereby more correctly regulating the position of the sealing member 23. Additionally, using the resin sheet 22-1 in frame form, the distance between the battery 30 and the cover body 21 may be shortened, thereby especially downsizing the mobile telephone 1 in the direction of the thickness of the battery.

Furthermore, the cover unit 20 may include a plurality of regulation units 26 which touch the inner periphery surface 22-1a of the resin sheet 22-1 in frame form, and a plurality of regulation units 27 which touch the outer periphery surface 22-1b of the resin sheet 22, thereby more correctly regulating the position of the sealing member 23.

In addition, according to the present embodiment, since the waterproof area is the battery storage unit 11, the above-mentioned cover unit (waterproof cover) 20 may downsize the mobile telephone 1, and reserving the cut-off performance of the battery storage unit 11.

All examples and conditional language provided herein are intended for pedagogical purposes of aiding the reader in understanding the invention and the concepts contributed by the inventor to further the art, and are to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile electronic device, comprising:
a body unit that includes a waterproof area; and
a cover unit that covers the waterproof area, wherein
one of the cover unit and the body unit includes: a sealing member that contacts a contact surface formed on a same plane as another of the cover unit and the body unit all along a periphery of the waterproof area and seals the waterproof area;
a plurality of regulation units that regulates a position of the sealing member;
a first nail unit engaged in another of the cover unit and the body unit; and
a resin sheet including the sealing member formed on a surface,
the plurality of regulation units regulate the position of the sealing member by touching the resin sheet,
a first regulation unit of the plurality of regulation units is provided as a unitary construction with the first nail unit,
the resin sheet is formed in frame form all along the periphery of the waterproof area,
and second regulation units of the plurality of regulation units touch an inner periphery surface of the resin sheet in frame form.

2. The mobile electronic device according to claim 1, wherein:
the first regulation unit and the first nail unit are provided as a unitary construction at a convex part that projects from the one of the cover unit and the body unit including a rectangular section one of whose four sides is open;
the first regulation unit regulates the position of the sealing member at an open side end part of the convex part; and
the nail first unit is provided at a close side end part opposite the open side end part.

3. The mobile electronic device according to claim 1, wherein:
the one of the cover unit and the body unit further comprises a second nail unit engaged in the another and a coupling unit that is provided as a unitary construction with the two nail units and connects the two nail units; and
the first regulation unit is provided as a unitary construction with the two nail units and the coupling unit.

4. The mobile electronic device according to claim 1, wherein a third regulation unit of the plurality of regulation units is provided as a unitary construction with a wall surface provided around the one of the cover unit and the body unit so that the third regulation unit projects from the wall surface.

5. The mobile electronic device according to claim 4, wherein the third regulation unit projects from the wall surface so that an open side end part including a rectangular section one of whose four sides is open faces the wall surface, and regulates the position of the sealing member at a close side end part opposite the open side end part.

6. The mobile electronic device according to claim 4, wherein the third regulation unit projects from the wall surface so that an open side end part as one side of an H-shaped section faces the wall surface, and regulates the position of the sealing member at another open side end part.

7. The mobile electronic device according to claim 1, wherein a third regulation unit of the plurality of regulation units is a wall surface provided around the one of the cover unit and the body unit.

8. The mobile electronic device according to claim 1, wherein the one of the cover unit and the body unit further comprises a plurality of regulation units that touch an outer periphery surface of the resin sheet.

9. The mobile electronic device according to claim 1, wherein the waterproof area is a battery storage unit.

10. A waterproof cover that is a cover unit that covers a waterproof area of a body unit of a mobile electronic device, comprising:
a sealing member that contacts all along a periphery of the area a contact surface formed on a same plane as the periphery of the waterproof area of the body unit, and seals the waterproof area;
a plurality of regulation units that regulate a position of the sealing member;
a nail unit engaged in the body unit; and
a resin sheet including the sealing member formed on a surface, wherein
the plurality of regulations units regulate the position of the sealing member by touching the resin sheet,
a first regulation unit of the plurality of regulation units is provided as a unitary construction with the nail unit,
the resin sheet is formed in frame form all along the periphery of the waterproof area, and
second regulation units of the plurality of regulation units touch an inner periphery surface of the resin sheet in frame form.

* * * * *